Feb. 26, 1957 R. A. RAMEY, JR 2,783,315

MAGNETIC AMPLIFIER CONTROL CIRCUIT

Filed July 20, 1951

INVENTOR
ROBERT A. RAMEY JR.

BY D. G. Snyder
Howard White
ATTORNEYS

United States Patent Office 2,783,315

Patented Feb. 26, 1957

2,783,315

MAGNETIC AMPLIFIER CONTROL CIRCUIT

Robert A. Ramey, Jr., Washington, D. C.

Application July 20, 1951, Serial No. 237,813

10 Claims. (Cl. 179—171)

(Granted under Title 35, U. S. Code (1952), sec. 266)

This invention relates in general to magnetic amplifiers and in particular to magnetic amplifier circuits which provide high gain and rapid time response with a substantially linear output characteristic.

It is, therefore, an object of the present invention to provide a new and improved magnetic amplifier having a rapid time response with high power gain.

Another object of the present invention is to provide a new and improved magnetic amplifier exhibiting a linear output characteristic substantially independent of variations in the line voltage of the energy source from which the output is derived.

A further object is to provide a magnetic amplifier having a relatively high power output for a given transformer size.

Still another object is to obtain a new and improved magnetic amplifier from conventional components arranged in a simple design.

Further objects of the present invention will become apparent from the following detailed description when taken in conjunction with the drawings in which.

Figure 1:
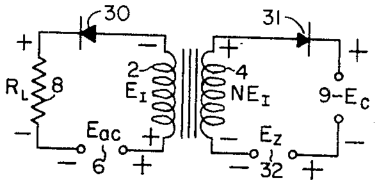
Fig. 1 is a schematic diagram of a half-wave magnetic amplifier of the present invention.

In my copending application Serial No. 237,814, filed July 20, 1951, now Patent No. 2,719,885, a series magnetic amplifier circuit is disclosed wherein the control voltage source is not depended upon for supplying the power for the amplifier control as is general in conventional magnetic amplifier circuits. It was further shown that the energy required for the amplifier cores is supplied entirely from the alternating current power source. The basis of the aforementioned co-pending application, as well as the present invention, is predicated on the theory that the magnetic amplifier is a voltage-sensitive device contra to the commonly presented theories relating to prior magnetic amplifiers as being current-sensitive devices.

More specifically problems relating to magnetic amplifiers are approached with a realistic evaluation of the constraints imposed by ferromagnetic materials upon the magnetic amplifier operation.

One of the primary assumptions used in the analysis set forth in my copending application is that the magnetization characteristic of the core is of the same rectangular loop type as Deltamax, Orthinol, etc., with relatively complete saturation at a very low value of magnetomotive force. With such loop characteristics as well as with the more conventional magnetization characteristics it is considered that the level of magnetization of a magnetic material in its unsaturated state is not uniquely determined by the magnetomotive force applied to the windings surrounding the core of magnetic material. The loop character of the magnetization characteristics of important ferromagnetic materials destroys any single-valued dependence between flux and ampere turns and makes this dependence almost indeterminate.

It is suggested, however, that the time integral of reactive voltage across a winding of a magnetic amplifier core can be utilized in determining uniquely the magnetization level. In other words the control or independent variable is in the nature of a voltage, rather than the control circuit current which is a variable dependent on the circuit configuration, parameter characteristics, auxiliary circuitry, control variable, etc. With the magnetization loop characteristics known, the magnetization level of the core can be determined from this equation $$e=\frac{d\theta}{-Ndt}$$

or, where the turns $N=1$, $\theta=-\int edt$ volt-seconds. Considering the double-core series amplifier of my copending application voltage is applied so as to change the magnetization level in accordance with the above equations. Thus, in the first phase of amplifier operation one of the cores deviates from saturation while the other core proceeds to saturation in the magnetization or nonconducting period, then saturates and allows load current to pass through the associated winding. That portion of the first phase of operation in which load current flows is hereinafter termed the conducting period. During the second phase of operation the magnetization of the cores are reversed from that of the first phase. It will be understood that the first and second phases of operation are usually the first and second half-cycles of applied load voltage. Also, since the windings associated with the cores are connected in series, output load current flows through both windings during at least a portion of each phase, excepting, of course, when the control voltage is set at no output.

Results obtained from embodiments constructed in accordance with the magnetic amplifier of my co-pending application show that a time response of the order of one-half cycle of applied voltage with high power gain may be obtained.

However, the series magnetic amplifier has several disadvantages inherent in its operation of which one is the non-linear output current vs. control voltage characteristic. In addition full use of the transformer capabilities are not attained since the A.-C. source must supply the power losses associated with the control circuit resistance. These disadvantages result mainly from the fact that a change in the magnetic flux level of each core occurs during times when full output current flows in the transformer windings. The changing flux level causes a voltage to appear across the winding associated with one of the cores while the other core is saturated and thus permitting conduction. This voltage subtracts directly from that voltage which is available for application to the load impedance.

An improvement over the practical operability of the series magnetic amplifier of the aforementioned copending application may be had by incorporating self-magnetizing features into circuitry which does not require a change of magnetization in a conducting transformer. This is accomplished by applying an alternating-current voltage to the primary winding of a particular transformer only during the first phase or, more usually, during the first half-cycle of the A. C. voltage cycle, to thereby cause the associated core to procede to saturation. During the second phase of operation the magnetization level of the core is reset by applying a second voltage to a secondary winding, the nature of the second voltage to be discussed hereinafter. In addition the windings are arranged in the amplifier circuit so that the windings associated with one core are to carry load current only during a single phase of operation in the application of the present invention to either single or multiple transformer embodiments.

A circuit embracing the principles of the present invention is shown in Fig. 1. The primary or load circuit includes transformer winding 2 to which an alternating-voltage source, $E_{ac}$ is to be applied from terminals 6. A suitable load element 8, shown as a resistor, is provided in series with winding 2 and with element 30 which is shown as a rectifier, but it being understood that any means of limiting the application of $E_{ac}$ to winding 2 to alternate half-cycle will suffice. In the secondary or control circuit a series circuit is shown which includes the secondary winding 4, a magnetizing A. C. voltage source $E_z$ connected to terminals 32, a D. C. control $E_c$ connected to terminals 9 and element 31 shown as a rectifier. Element 31 may be any parameter which allows the application of magnetizing voltage $E_z$ to winding 4 only during alternate half-cycles and is to be arranged in the circuit so as to prevent current flow from the D. C. control voltage $E_c$.

In operation of the magnetic amplifier of Fig. 1 the changing of the flux level is eliminated in a core the windings of which are carrying output current by allowing that transformer winding to conduct only during alternate half-cycles and to set the magnetization level of the core during the other half-cycles. To accomplish this, the A. C. supply voltage $E_{ac}$ at terminal 6 is applied to transformer primary winding only during positive half-cycles; during negative half-cycles the element 30 blocks the A. C. voltage from the transformer winding. In the transformer secondary, or control circuit, element 31 is placed in series opposition to the control voltage $E_c$ at terminal 9 which is in series with a magnetizing voltage $E_z$ at terminals 32.

During positive half-cycles of $E_{ac}$ the magnetizing voltage $E_z$ tends to prevent flow of current through the control circuit winding 4 due to voltage ($NE_I$) transformed from the primary circuit into the control winding 4 and during negative half-cycles of $E_{ac}$, $E_z$ accomplishes the appropriate magnetization of the transformer core. A consideration of the optimum requisites of $E_z$ indicates that this voltage can be equal, theoretically, to $NE_{ac}$ in amplitude and of opposite instantaneous polarity, N being the transformer ratio. Setting $E_z$ equal to $NE_{ac}$ neglects the small voltage drops across the rectifier impedance and control winding resistance, thus, by way of compensation, $E_z$ should be of slightly greater magnitude than the theoretical value. Instantaneous polarity of the various parameters for the positive half-cycle of $E_{ac}$ are indicated in Fig. 1.

Control voltage function $E_c$ may be a direct-current voltage, a full-wave rectified A. C. voltage of line frequency and phase with means for varying the amplitude, or an alternating-current voltage if the necessary precautions are observed.

Figure 2:
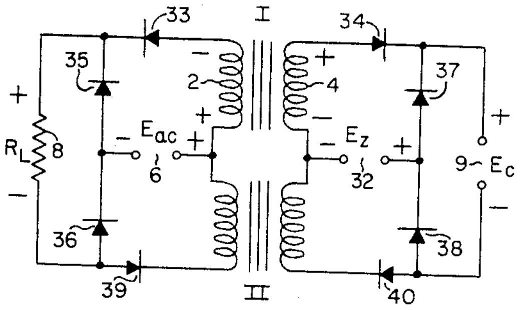
Fig. 2 is a schematic diagram of the parallel full-wave variant of the magnetic amplifier of Fig. 1.

The output current flowing in winding of the single core magnetic amplifier is of half-wave rectified form. Full-wave rectified output is obtained by appropriate paralleling of two single-core amplifiers such as shown in Fig. 2. The primary or output circuit is the same as the well known self-saturating bridge-type parallel magnetic amplifier. The transformer secondary terminals are connected in the same manner as the primary to the same bridge-type circuit with the exception that the load impedance $R_L$ is replaced by the control voltage $E_c$.

In the primary circuit the full load current flows in alternate half-cycles through the windings associated with core I and core II respectively. The existence of rectifiers 33 and 39 prevents the application of line voltage $E_{ac}$ to the core which is not permitted to conduct during any particular half-cycle.

In the secondary circuit the voltage $E_z$ is chosen to be of the same phase as the A. C. line voltage and of magnitude $NE_{ac}$. The control voltage $E_c$ is again chosen as full wave rectified A. C. of line frequency and phase and with variable amplitude.

During the non-conducting period (neither core is saturated) in the positive half-cycles of $E_{ac}$, with instantaneous polarities as shown in Fig. 2, the active portion of the load circuit includes the voltage source $E_{ac}$, load winding 2 of core I, rectifier 33, load $R_L$ and rectifier 36. As core I is unsaturated, substantially all the voltage $E_{ac}$ will appear across winding 2 as $E_I$ or $$E_{ac}=E_I \quad (1)$$

In the control circuit the active circuit path includes magnetizing voltage $E_z$, rectifier 37, control voltage $E_c$ in opposition to $E_z$, rectifier 40 and the control winding of core II. The difference voltage $(E_z-E_c)$ is applied to the control winding of core II as $E_{II}'$, or, $$E_z-E_c=E_{II}' \quad (2)$$

Analogous to Equations 1 and 2, the following equations hold during the non-conducting period in the negative half-cycles of $E_{ac}$:

$$E_{ac}=E_{II}$$

$$E_z-E_c=E_I'$$

Either core when saturated has substantially zero reactive volts across the corresponding control or primary winding. Therefore, during the period of conduction in the positive half-cycles the voltage $E_{ac}$ appears across load circuit resistance $R_L$, current flowing in the circuit described above. This is expressed as:

$$E_{ac}=I_LR_L \quad (3)$$

In the control circuit Equation 2 still obtains:

$$E_z-E_c=E_{II}'$$

Similarly, during negative half-cycles:

$$E_{ac}=I_LR_L$$

$$-E_z-E_c=E_I' \quad (4)$$

This may be summarized as follows:
Either core proceding to saturation will have $$|E_I|=|E_{II}|=|E_{ac}| \quad (5)$$

across its load winding in the appropriate direction.

Either core deviating from its saturated state will have in both the conducting and non-conducting periods:

$$|E_I'|=|E_{II}'|=|E_z|-|E_c|$$

across its control winding, or $$|E_I|=|E_{II}|=|E_{ac}|-\left|\frac{E_c}{N}\right| \quad (6)$$

across its load winding in the appropriate direction.

During conducting periods the output current will be:

$$I_L=\frac{E_{ac}}{R_L} \quad (7)$$

A solution of the above equations for the phase angle at which conduction occurs may be easily obtained. This gives:

$$\cos\theta_n=\frac{2|\hat{E}_c|}{E_z}-1$$

$$=\frac{2|\hat{E}_c|}{NE_{ac}} \quad (n>1) \quad (8)$$

This means the phase angle of conduction for any *nth* half-cycle is dependent entirely upon the control voltage of the previous half-cycle. In other words the time for full response is a half-cycle of A. C. voltage no matter what the other parameters of the circuit may be.

The average output current may be expressed as:

$$I_L\ (\text{ave})=\frac{1}{\pi}\frac{|\hat{E}_{ac}|}{R_L}\ (1+\cos\theta_n)$$

or substituting from Equation 8;

$$I_L\ (\text{ave})=\frac{E_c\ (\text{ave})}{NR_L} \qquad (9)$$

From this it is seen that the average output current is directly proportional to the average control voltage. Further, this output magnitude is independent of the A. C. supply voltage. Changes in the line voltage will not effect these relationships so long as the output current is below the saturation value for the amplifier setup.

Figure 3:
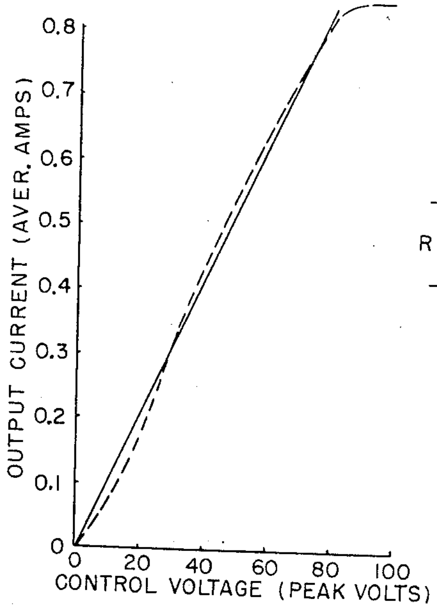
Fig. 3 is a control voltage V output current graph of the magnetic amplifier shown in Fig. 2.

A parallel magnetic amplifier substantially as shown in Fig. 2 was assembled and tested. The resulting transfer characteristic is shown in Fig. 3 by the dotted line, along with the calculated "ideal" characteristic shown by the solid line. The results confirm the relationship predicted both in character and magnitude.

The component of $R_L$, due to the rectifier impedance, is a variable the average value of which was determined experimentally from voltage measurement at one-half of maximum output current. The minor deviations of the experimental curve from that predicted can be explained to a great extent, by this choice of constant rectifier impedance.

The output current's independency of line voltage was also checked experimentally. With the control voltage set a constant value to give one-fourth maximum output current the line voltage was reduced to 50% of nominal value with less than 10% change in output average current.

Time of response measurements for the experimental amplifier show that output current reaches steady-state condition one-half cycle after application or removal of control voltage.

At all times during amplifier operation of the circuit of Fig. 2 one of the transformer cores is being caused to deviate from its saturated condition because of the voltage relations existing in the control circuit. If the magnetization loops were vertical, the cores perfectly matched and the rectifiers ideal, the current flow in the control circuit would be a D. C. value corresponding to one-half the width of the magnetization loop. This D. C. control current would flow through the control source in the direction opposite to the control voltage, i. e. the "control power" must be absorbed by the control source. If, however, a constant current of the same magnitude were drawn from the control source the net current could be made ideally zero and consequently the "input power" would be zero allowing amplifier "gain" to be infinite.

Figure 4:
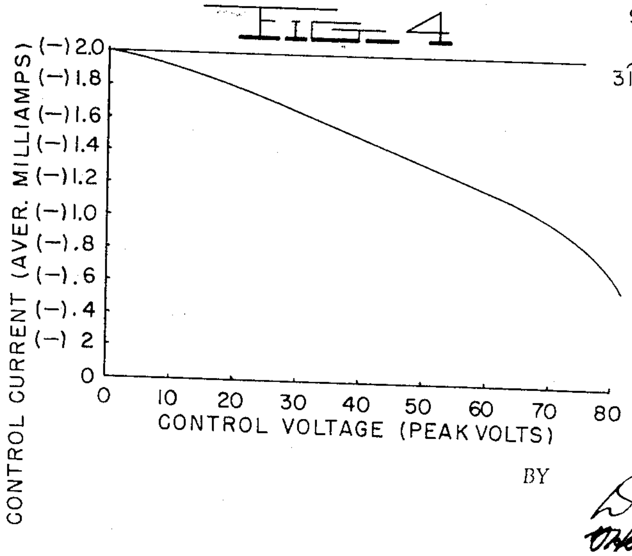
Fig. 4 is a control voltage V control current graph of the magnetic amplifier shown in Fig. 2.

The control current for the parallel circuit of Fig. 2 is shown in Figure 4 along with the calculated "ideal" characteristic. Rectifier leakage in the output circuit and "non-ideal" cores are easily seen to be principal causes for the decrease in control current as control voltage increases. It has been experimentally determined that the major difficulty arises from the rectifiers.

It has been experimentally determined that "gains" of more than a thousand can be obtained at 60 cycles per second (with 100% response within a cycle) using materials now abundantly available commercially and without compensating for control current. With care in selections of core materials and rectifiers, "gains" of the order of 10,000 at 60 cycles per second are possible. The response time will remain less than one cycle in comparison with commercially available magnetic amplifiers which, when an attempt is made to approach a one-cycle response time, exhibit power gains in the range of 20 to 50. Operation at higher frequencies would give increasingly better performance of the circuits of the present invention.

Elimination of the necessity for magnetizing the transformer cores when a large current flows in their coils and the use of the control source as a passive element whose voltage is measured has resulted in considerable movement in magnetic amplifier characteristics. The obvious improvement is the simultaneous availability of: short response time, high gain, good linearity, wide output range, virtual independence of supply voltage and good output power/weight ratios.

Figure 5:
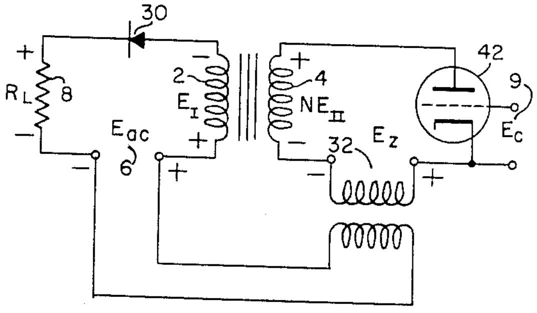
Fig. 5 is a schematic diagram of a half-wave variant of the magnetic amplifier of Fig. 1.

An understanding of the basic fundamentals of magnetic amplifier operation will admit of many variations of the magnetic amplifier configuration of Figs. 1 and 2 as the theory discussed above enables the prediction of the operation characteristics of any particular amplifier configuration. Special amplifier circuits may be easily designed for particular problems. By way of example a simple variant is shown in Fig. 5. The circuit parameters of this configuration are numbered to correspond with corresponding parameters of Fig. 1.

Rectifier 31 of Fig. 1 has been replaced by vacuum tube triode 42. The control voltage $E_c$ is applied to the grid of triode 42. In addition the function $E_z$ is shown to be obtained by appropriate transformation of the A.-C. load voltage $E_{ac}$.

In operation variation of control voltage $E_c$ varies the voltage drop across triode 42. This voltage drop subtracts directly from the magnetizing voltage $E_z$ during negative half-cycles of $E_{ac}$, the resultant difference voltage accomplishing the appropriate magnetization of the transformer core.

A consideration of the requirement of the control element will show that the triode 42, which acts as a variable impedance in the circuit, adequately introduces into the circuit the necessary function, i. e. a voltage, either A.-C. or D.-C., which functions to reduce the value of magnetization voltage $E_z$ applicable to the control winding in the appropriate phase. Among the other elements which may be utilized to introduce this function are the simple variable resistor and the gaseous electron discharge device.

The configuration of Fig. 5 may be likewise varied as Fig. 1 to obtain full-wave output. The single-core type of magnetic amplifier is not necessarily the most useful configuration but serves as a convenient means for the illustration of the present invention.

Figure 6:
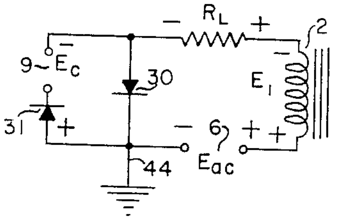
Fig. 6 is a schematic diagram of another half-wave variant of the magnetic amplifier of Fig. 1.

Another variation of the magnetic amplifier of Fig. 1 is shown in Fig. 6. This configuration is essentially the electrical equivalent of and operates similarly to the amplifier of Fig. 1. The corresponding parameters have like reference numerals, the main distinctions between the two circuits being that in the amplifier of Fig. 6 only a single winding is used and that voltage $E_{ac}$ also performs the function of voltage $E_z$.

While the configuration of Fig. 6 is relatively simple and inexpensive in design, it has disadvantages in that electrical isolation between the control and load circuits is reduced and there can be no turns ratio other than unity. The fact that the load circuit resistance $R_L$ is in the control circuit is not particularly disadvantageous because of the negligible current flow during the half-cycle of $E_{ac}$ when the control circuit is effective.

A degree of electrical isolation between the control and load circuits of Fig. 6 may be provided by electrical ground 44. Variation in turns ratio may also be provided by utilizing an autotransformer winding in place of winding 2 of Fig. 6.

The configuration shown in Fig. 2 illustrates a method for obtaining full-wave rectified output. It is to be realized that alternating current output may also be obtained by the appropriate insertion of the load impedance in the load circuit.

With the use of the magnetic amplifier for controlling A.-C. impedance loads, which may be partially inductive, the effect of the inductance in the load circuit should be taken into account. Current will now tend to flow in the load circuit during a portion of the second half-cycle of applied A.-C. voltage. It is to be desired that the magnetizing voltage $E_z$ should not be applied to the control winding until current in the load circuit is substantially zero.

In view of this fact a slightly different analysis is used. The cyclical operation of the amplifier may be considered to take place in two phases rather than in odd and even half-cycles of applied A.-C. voltage. During the first phase the transformer core is caused to proceed to saturation by the application of the load voltage. The second phase begins when the current in the load circuit is substantially zero, which current, as stated above, may be prolonged by the action of an inductive load into the second half-cycle of applied A.-C. voltage. During the second phase of operation the transformer core is caused to deviate from saturation by the application of the magnetizing voltage $E_z$. The function $E_z$ may be obtained from the load circuit as shown in Fig. 5 except that the transformer voltage is derived from both the A.-C. source and the inductive load.

Should the load impedance be partially capacitive, the capacitance will exhibit unidirectional voltage during the magnetization period. It may therefore be necessary to include an auxiliary circuit shunting the load impedance in the load circuit in order to allow normal magnetization operation.

Although certain specific embodiments have been shown and described many modifications and variations are possible without departing from the spirit of the present invention. Therefore, this invention is not to be limited except insofar as is necessary by the scope of the disclosure.

The invention described herein may be manufactured and used by or for the Government of the United States of America for governmental purposes without the payment of any royalties thereon or therefor.

What is claimed is:

1. In a magnetic amplifier, a high remanence saturable magnetic core, a control circuit coupled to said core, an alternating supply voltage having first and second half cycles in said control circuit operative to drive said core toward saturation during a first half cycle, a demagnetizing control circuit coupled to said core and an alternating voltage of the same phase and frequency as said supply voltage operative to reduce the magnetization level of the core during second half cycles of said supply voltage, control means in said demagnetizing circuit to vary the degree of demagnetization of the core during the second half cycles of the supply voltage.

2. In a magnetic amplifier, a high remanence saturable magnetic core, a control circuit coupled to said core, a demagnetizing circuit coupled to said core, an alternating voltage supply source in said control circuit and demagnetizing circuit having first and second half cycles of operation, unilateral impedance means in said control circuit poled so that the said core is increased in magnetization level during the first half cycles of said supply voltage, unilateral impedance means in said demagnetizing circuit poled such that the supply voltage will demagnetize said core during the second half cycles of said voltage, a variable control voltage in said demagnetizing circuit poled to oppose said demagnetizing supply voltage and operable to variably reduce the demagnetizing action of said core during the second half cycles of said supply voltage.

3. A magnetic amplifier comprising a saturable magnetic core having a winding wound thereon, a load impedance and an alternating voltage source having first and second half cycles of operation in series with said winding, a first unidirectional current flow means polarized to provide a magnetizing current flow through said winding during the first half cycles of said alternating voltage source, a second unidirectional current flow means in parallel with and of opposite polarity to said first unidirectional current flow means to provide a demagnetizing current flow through said winding during the second half cycles of said alternating voltage source, a constant polarity voltage source in series with said second means and polarized to oppose the demagnetizing current during the second half cycles of said alternating voltage source.

4. A magnetic amplifier comprising a saturable magnetic core; a load winding and a control winding wound on said core; a load circuit including said load winding, an alternating current load voltage source for applying a voltage to said load winding to cause said core to proceed to saturation and unilateral impedance means for coupling alternate half cycles of said load voltage to said load winding; and a control circuit including said control winding, an alternating-current demagnetizing voltage source of the same frequency as said load voltage source for applying a demagnetizing voltage to said control winding to cause said core to deviate from saturation, unilateral impedance means for coupling alternate half cycles of said demagnetizing voltage to said control winding in half cycle alternation with the coupling of load voltage to said load winding, and a control voltage source for reducing the value of said demagnetizing voltage applicable to said control winding, such that the desired magnetization level of said core is set.

5. Apparatus for controlling the application of an alternating-current load voltage to a load impedance comprising a magnetic amplifier having a load winding wound on a saturable magnetic core, a series load circuit including said load winding, load voltage, load impedance and a first unilateral impedance, said first unilateral impedance blocking the application of odd half-cycles of said load voltage to said load winding, a control winding also wound on said saturable core, a series control circuit including said control winding, a constant polarity control voltage source, a second unilateral impedance and an alternating-current demagnetizing voltage source of substantially the same frequency and phase as said load voltage, said second unilateral impedance being poled to prevent the flow of current from said control voltage source to said control winding and to block the application of even half-cycles of said demagnetizing voltage to said control winding.

6. Apparatus for controlling the application of a voltage to a load impedance comprising a magnetic amplifier having a saturable magnetic core, saturation control means coupled to said core, a load impedance, a first unilateral impedance, a second unilateral impedance, a constant polarity voltage source, an alternating voltage source having odd and even half cycles, a series connected load circuit including said first unilateral impedance means, said alternating voltage source, said load impedance and said saturation control means, said first unilateral impedance means polarized to provide a magnetizing voltage to said saturation control means during odd half cycles of said alternating voltage source, a series connected control circuit including said second unilateral impedance means, said alternating voltage source, said constant polarity source and said saturation control means, said second unilateral impedance means polarized to provide a demagnetizing voltage to said saturation control means during even half cycles of said alternating voltage source, said constant polarity voltage source having a potential no larger than said demagnetizing voltage and polarized to oppose said demagnetizing voltage applied to said saturation control means.

7. Apparatus as in claim 6 wherein said saturation control means has one winding on said saturable magnetic core.

8. Apparatus as in claim 6 wherein said saturation control means has two windings on said saturable magnetic core.

9. Apparatus as in claim 6 wherein said saturation control means constitutes two windings on said saturable magnetic core and wherein said second unilateral impedance means constitutes electronic discharge tube having at least an anode, a cathode and a control electrode.

10. Apparatus for controlling the application of a load voltage to a load impedance comprising a saturable magnetic core, a load winding on said core, control winding on said core, a load impedance, a first unidirectional voltage source having periodically spaced voltage changes, a load circuit including said load winding, said load impedance and said first source serially connected to provide a magnetizing voltage across said load winding during the voltage changes of said first voltage source, a second unidirectional voltage source having spaced voltage changes of the same periodicity and interspersed between the voltage changes of said first voltage source, a constant polarity voltage source, a control circuit including said second voltage source serially connected to said load winding and said constant polarity voltage source to provide a demagnetizing voltage across said control winding during the voltage changes of said second voltage source, said constant polarity voltage source polarized opposite to said second voltage source and having a magnitude no greater than said second voltage source.

References Cited in the file of this patent

UNITED STATES PATENTS

| | | |
|---|---|---|
| 2,108,642 | Boardman | Feb. 15, 1938 |
| 2,164,383 | Burton | July 4, 1939 |
| 2,503,039 | Glass | Apr. 4, 1950 |
| 2,531,211 | Glass | Nov. 21, 1950 |
| 2,603,768 | Trindle | July 15, 1952 |

FOREIGN PATENTS

| | | |
|---|---|---|
| 480,067 | Great Britain | Feb. 16. 1938 |